United States Patent [19]

Worden

[11] 4,248,578
[45] Feb. 3, 1981

[54] CHEESE MOLDING PROCESS AND APPARATUS THEREFOR

[75] Inventor: Donald G. Worden, Beaver Dam, Wis.

[73] Assignee: Stainless Steel Fabricating, Inc., Columbus, Wis.

[21] Appl. No.: 917,776

[22] Filed: Jun. 21, 1978

[51] Int. Cl.³ .............................................. A01J 25/13
[52] U.S. Cl. .................................. 425/220; 425/227; 425/238; 425/261; 425/439; 425/441; 425/442; 426/389
[58] Field of Search ........ 425/220, 227, 238, 436 RM, 425/439, 442, 261, 84, 441; 426/389

[56] References Cited

U.S. PATENT DOCUMENTS

| | | | |
|---|---|---|---|
| 2,840,909 | 7/1958 | Dzenis | 425/220 |
| 3,047,951 | 8/1962 | Le Boeuf | 425/261 |
| 3,098,297 | 7/1963 | De Boer | 425/261 |

Primary Examiner—James H. Derrington
Attorney, Agent, or Firm—Quarles & Brady

[57] ABSTRACT

A process for molding a cheese piece of a desired shape comprises filling a mold having a hollow interior of the desired shape with softened, uncured cheese, cooling the mold to harden and partially cure the cheese, and then opening the mold to release the cheese piece under the surface of a cold brine so that the fluid pressure of the brine prevents the shape of the partially cured cheese piece from being distorted. An apparatus for automatically performing the described method is disclosed.

13 Claims, 9 Drawing Figures

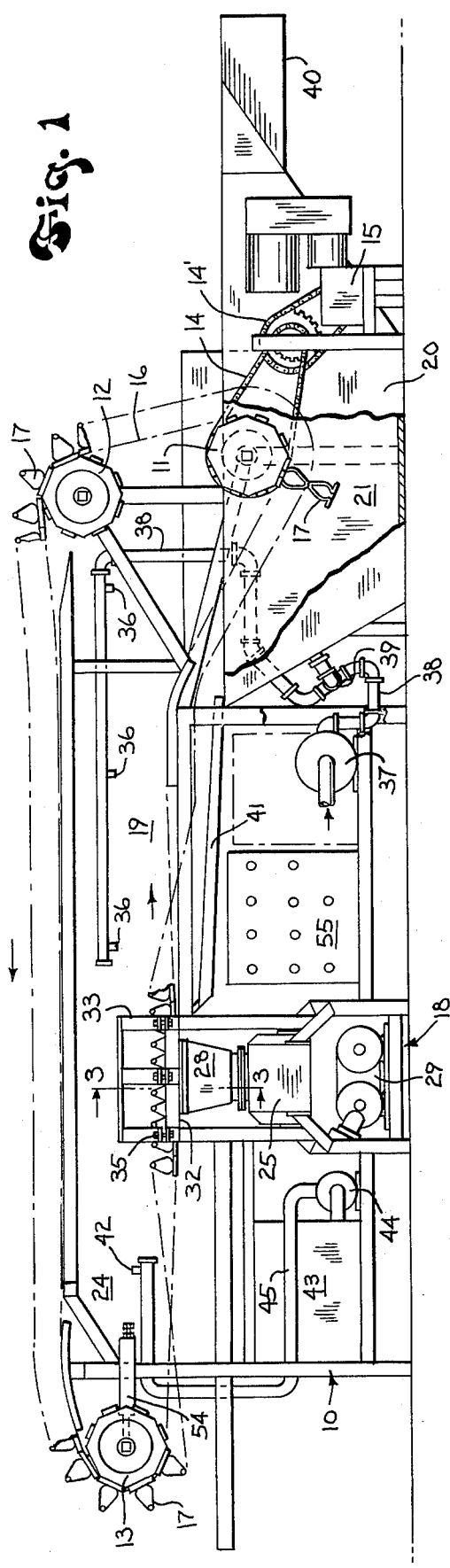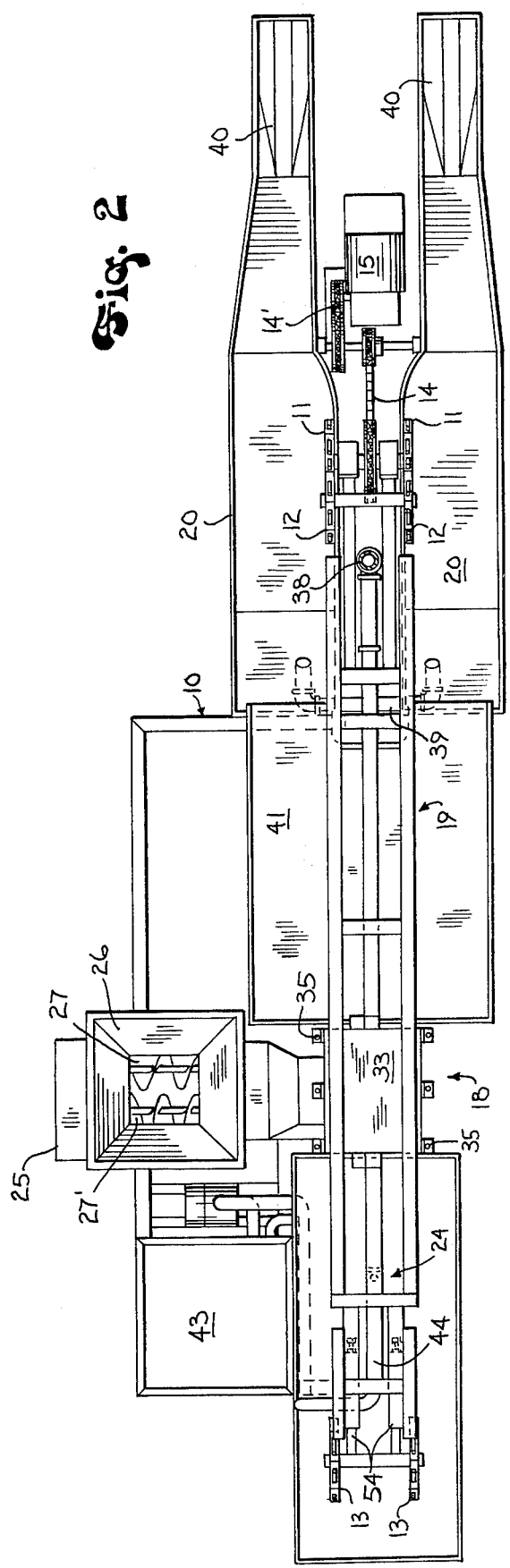

CHEESE MOLDING PROCESS AND APPARATUS THEREFOR

BACKGROUND OF THE INVENTION

Cheeses of different flavors have traditionally been made in distinctive shaped pieces, and consumers have come to identify the type and flavor of cheeses by the shapes of the cheese pieces. For example, mozzarella has been traditionally made in pear-shaped pieces. Other cheeses have been made in the shape of flattened balls, cones or cylinders.

In recent years, the increased demand for such cheeses has stimulated attempts to mass produce pieces of the cheeses in their traditional shapes. However, todate, such attempts have not been completely successful; it has been especially difficult to mass produce consumer size cheese pieces in the more complex traditional shapes.

SUMMARY OF THE INVENTION

It is the general object of the present invention to disclose a process and apparatus for molding cheese pieces in desired shapes.

It is another object of the invention to disclose a process for continuously and automatically molding cheese pieces.

It is a further object of the invention to disclose an apparatus for the continuous automatic molding of cheese pieces of desired shapes.

The process of the present invention comprises filling an empty mold having a hollow interior of the desired shape with softened, uncured cheese, cooling the mold to harden and partially cure the cheese, and then opening the mold to release the cheese piece under the surface of a cold brine so that the fluid pressure of the brine prevents the shape of the partially cured cheese piece from being distorted.

An apparatus for performing the process of the present invention includes at least one split, hinged mold having an interior of the desired shape, means for filling said mold with soft, uncured cheese, means for cooling the cheese in the mold to partially harden and cure the cheese, a liquid tank and means for transporting said mold from the filing means, to the cooling means and to a location in the liquid tank where the mold is opened to release the partially cured cheese piece below the surface of liquid so that the fluid pressure of the liquid prevents the shape of the partially cured cheese piece from being distorted. The apparatus may also include means for automatically opening and closing the molds and means for washing the molds from which the cheese pieces have been released to remove any residual cheese.

In one embodiment of the apparatus the means for transporting the mold is an endless belt made up of a plurality of mold assemblies joined together and drive means for moving said belt. Each of the plurality of mold assemblies which makes up the endless belt is preferably attached to each of the immediately adjacent mold assemblies by pins which permit the mold assemblies to be individually tipped or inverted without putting stress upon the remainder of the belt.

In the preferred embodiment there are two endless belts each comprised of a plurality of mold assemblies, the filling means is an extruder having two outlets for the soft, uncured cheese and there are controls for controlling the output of the extruder and the speed of the belts. In addition, the movement of the belts is coordinated so that an unfilled mold of one or the other of the belts is being filled with cheese at all times. This arrangement makes it possible to continuously extrude the soft, uncured cheese without interruption so that the softened cheese does not have time to cure and harden in the extruder and interfere with the filling of the molds.

The preferred apparatus is further provided with spaced apart guide rails which automatically guide, open and close the molds at desired locations.

The preferred process and apparatus makes it possible to automatically produce molded cheese pieces of even complex shapes without the need for extensive manual handling.

These and still other objects and advantages of the invention will be apparent to those skilled in the art from the description and the drawings which follow.

BRIEF DESCRIPTION OF THE DRAWINGS

FIG. 1 is a side view, partially in section, of a preferred embodiment of the apparatus of the present invention;

FIG. 2 is a top plan view of the apparatus of FIG. 1;

DESCRIPTION OF THE PREFERRED EMBODIMENTS

Figure 3:
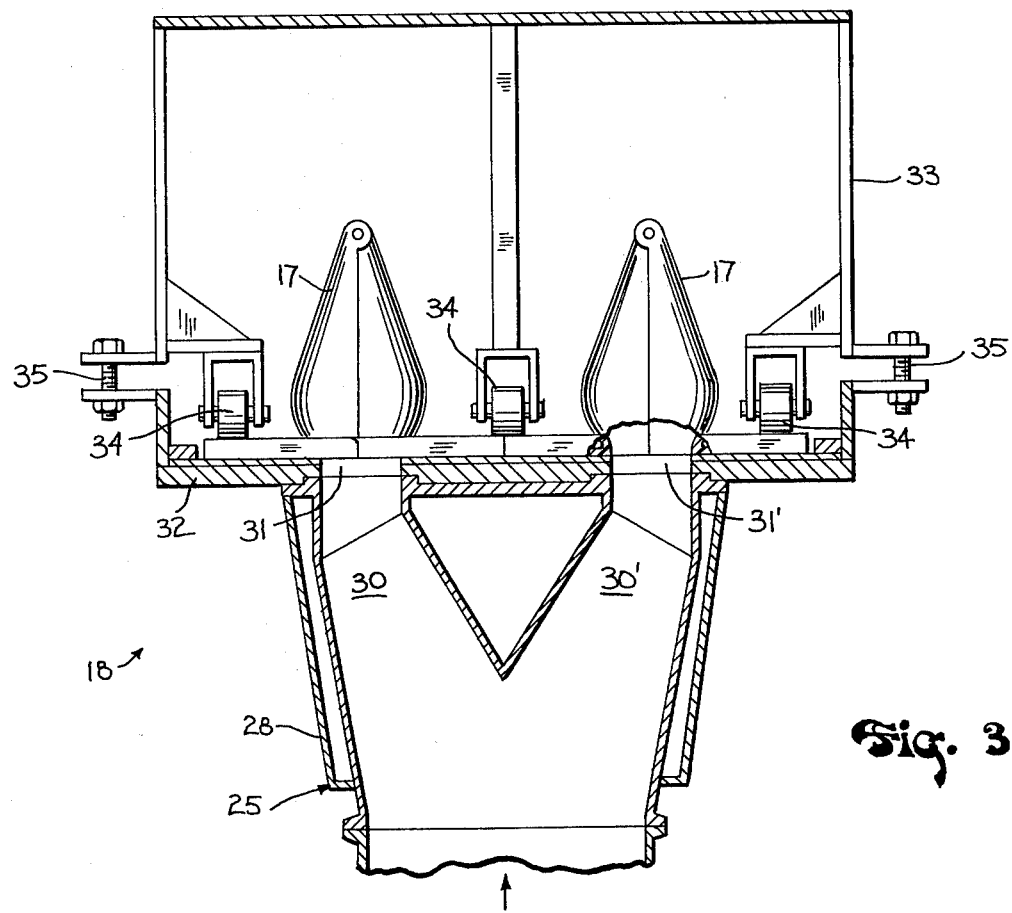
FIG. 3 is an enlarged view in section taken in the plane of the line 3—3 in FIG. 1.

In the preferred process of the present invention an empty mold having a hollow interior of the desired shape is filled with soft, uncured cheese, the mold with the cheese inside is cooled to harden and partially cure the cheese and then the mold is placed under the surface of a cold brine and opened to release the partially cured cheese piece into the brine where the fluid pressure of the brine prevents the shape of the cheese piece from being deformed. In an especially preferred embodiment, the empty mold from which the cheese piece has been released is closed, washed, returned to be filled and the process repeated.

The process will now be further described in connection with the description of the preferred apparatus for performing the process which is shown in the drawings.

As seen in FIGS. 1–5 of the drawings, the apparatus for performing the process includes a frame 10, drive sprockets 11, return sprockets 12, and guide sprockets 13. The drive sprockets 11 are operatively connected by drive chains 14, 14' to a drive motor 15.

In FIG. 1, there can be seen partially in broken line, one of the pair of endless belts 16 which are wrapped about the drive sprocket 11, idler sprocket 12 and guide sprocket 13. The endless belts 16 carry the split molds 17 from a filling station 18, where the molds 17 are filled with soft, uncured cheese, to a cooling station 19 where they are sprayed with cold brine to cool and partially cure the cheese and to a saddle tank 20 which contains cold brine 21. As the molds 17 enter the saddle tanks 20, they are guided and inverted by curved spaced apart guide rails 22 (see only in FIG. 6). The inverted split molds 17 are opened and maintained in the open position by the guide rails 22 below the surface of the brine 21 to insure the release of partially cured cheese piece 23 (seen only in FIG. 6). The external shape of the cheese piece 23 matches the interior shape of the mold 17, and it is prevented from being deformed by the fluid pressure of the brine 21. The brine 21 must be of sufficient concentration so that the cheese piece 23 will float.

Figure 6:
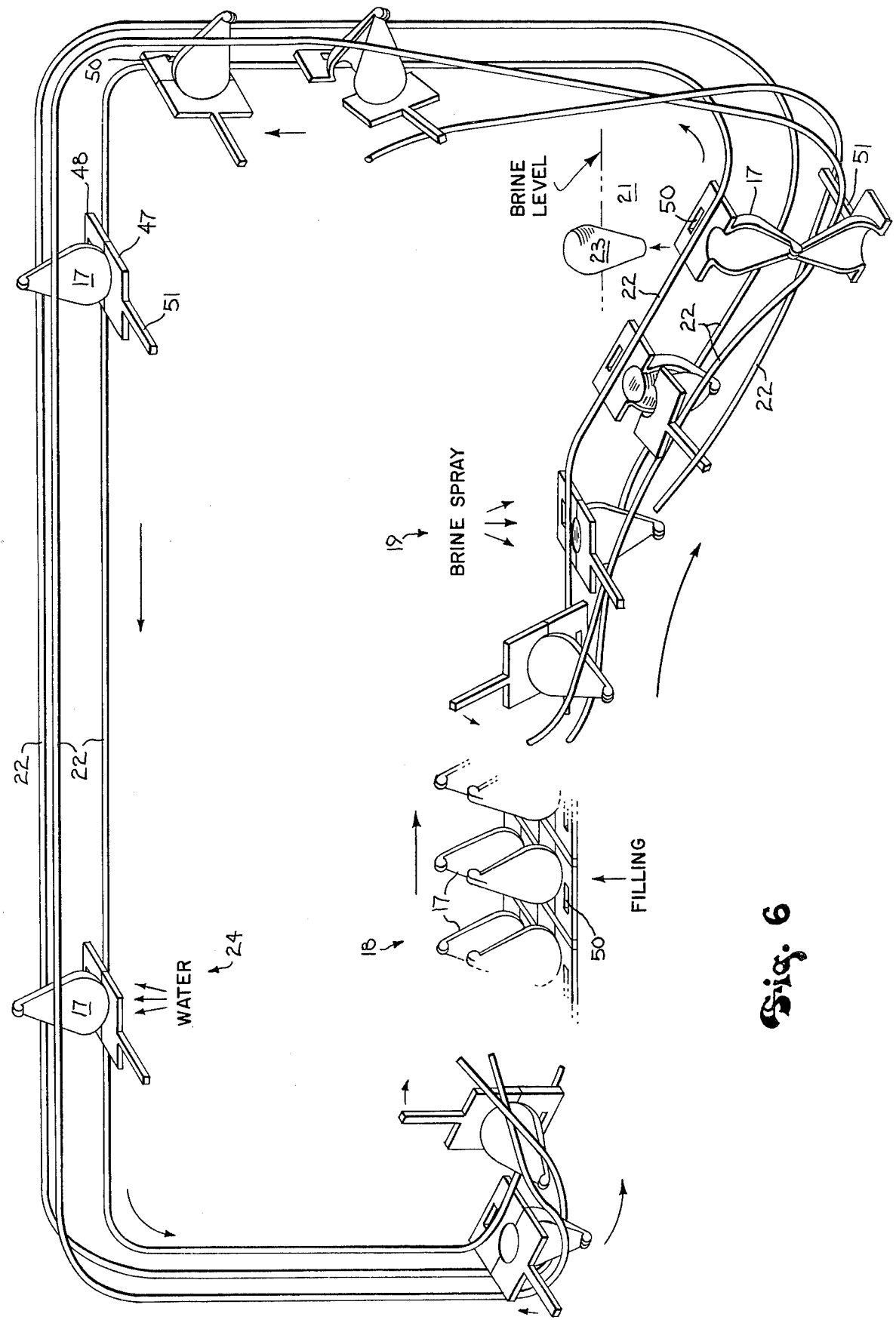
FIG. 6 is a schematic view showing the positions the mold assemblies of the apparatus assume during the performance of the process of the invention.

A schematic drawing showing the various positions assumed by the mold 17 during the process and the shape and spacing of guide rails 22 is shown in FIG. 6. As can be seen therein, the guide rails 22 maintain the split, hinged mold 17 in a closed position as it is being filled, invert it, permit it to open as it enters the tank 20 and hold it open beneath the surface of the brine 21. The guide rails 22 also close the open, empty mold 17 as it moves up and about the drive sprocket 11 and maintain it in an upright closed position as it is transported to and through a washing station 24 where the interior of the mold 17 is sprayed with hot water to remove any residual cheese. Upon leaving the washing station 24, the guide rails 22 maintain the mold 17 in a closed position as it passes over the idler sprocket 12 and then tip and invert the mold 17 so that it is once again in an upright position at the filling station 18 and it can be filled with the soft, uncured cheese.

Returning now to FIGS. 1 and 2, it is seen that the filling station 18 of the preferred apparatus includes an extruding machine 25 which has a hopper 26 for receiving soft, uncured cheese, a pair of augers 27, 27' for moving the uncured cheese from the hopper 26 to a filling neck 28 and a drive motor 29 for driving the augers. The augers 27, 27' are preferably teflon coated for easy cleaning. A commercially available machine particularly well suited for use as the extruder is the Supreme Molding available from the Stainless Steel Fabricating Company of Columbus, Wisconsin.

In FIG. 3 it can be seen that the filling neck 28 is internally divided to form a pair of passages 30, 30'. The passages 30, 30' terminate in outlets 31, 31' in the top of the filling station table 32 (see best in FIGS. 4 and 5). The filling neck 28 is constructed with a double wall through which hot water can be circulated to keep the uncured cheese warm and soft.

Figure 4:
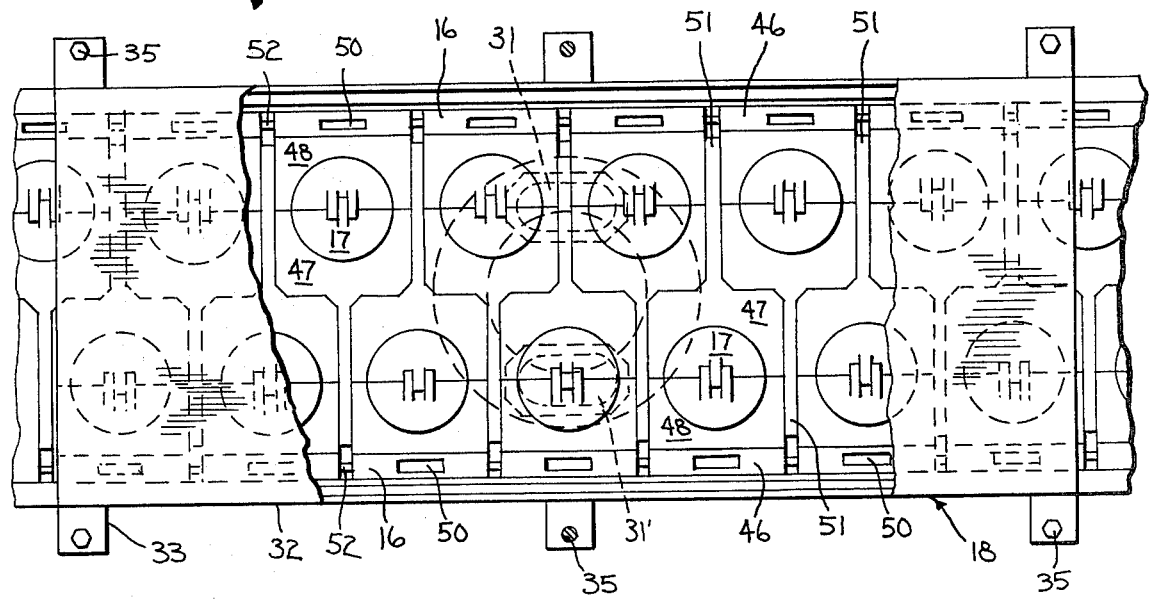
FIG. 4 is an enlarged top plan view, partially in section, showing the meshed endless belts at the filling station of the apparatus of FIG. 1.
Figure 5:
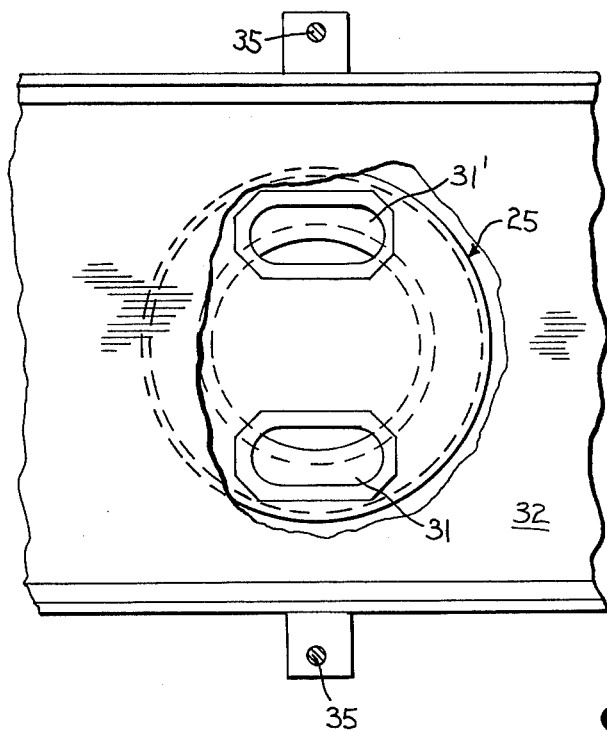
FIG. 5 is a view showing the top of the filling table of the apparatus of FIG. 1.

Turning now to FIG. 4, it can be seen that as the belts 16 pass through the filling station 18 they mesh. When properly meshed as shown, one or two of the molds 17 of a belt 16 are always positioned over an outlet 31, 31' to receive cheese. As a result, the flow of cheese from the extruding machine 25 is continuous. The preferred meshed belts 16 present a solid bottom surface which is interrupted only by the open bottoms of the molds 17 so that the cheese is prevented from flowing from the outlets 31, 31' anywhere except into the molds 17. To keep the bottom of the meshed belts 16 in close contact with the top of the filling station table 32, a pressure plate assembly 33 is provided. The pressure plate 33 has three sets of rollers 34. The rollers 34 exert downward pressure on the outside edges of the belts 16 and on the center of the meshed belts 16 keeping the bottom of the meshed belts 16 flat and in contact with the top of the filling table 32. The amount of pressure exerted by the pressure plate assembly 33 can be varied by adjusting the bolts 35 which connect the pressure plate assembly 33 to the filling table 32.

Returning to FIGS. 1 and 2, it can be seen that the cooling area 19 includes an array of brine spray nozzles 36. The brine spray nozzles 36 are supplied with cold brine from a refrigerated source by a pump 37 which receives the refrigerated brine and forces it under pressure through pipes 38 to brine spray nozzles 36. The pump 37 also forces cold brine from the refrigerated source through a manifold 39 into the saddle tanks 20 to provide brine flow to carry the cheese pieces 23 from the tanks 20 through weirs 40 to a final curing tank (not shown). The sprayed brine which passes over the filled molds 17 is caught in a brine pan 41 and conveyed to the saddle tanks 20. The curing time of the cheese piece 23 is effected by the temperature of the sprayed brine, the cold brine in the saddle tanks 21 and the brine in the final curing tank. The temperture of the brine is usually maintained below 38° F., and preferably at 28°-32° F., for best results.

Referring to FIGS. 1 and 6, it can be seen that once the partially cured cheese piece 23 has been released from the mold 17, the mold 17 is closed by the guide rails 22 and the empty molds 17 are washed to free them of residual cheese by a spray of hot water which is directed into the interior of the empty mold 17. As seen only in FIG. 1, a water spray nozzle 42 is provided which is supplied with hot water under pressure from a water tank 43 by a pump 44 via piping 45.

From the foregoing description and FIG. 6, it will be apparent that in the performance of the process at any given time some of the molds 17 on the endless belt 16 will be in an upright position, others in a tilted position and still others in an inverted position. The preferred form of the belt 16 which permits the individual molds 17 to assume their required positions without exerting destructive force on the remainder of the belt 16 or causing the molds 17 to separate from the belt 16 will now be described.

Figure 7:
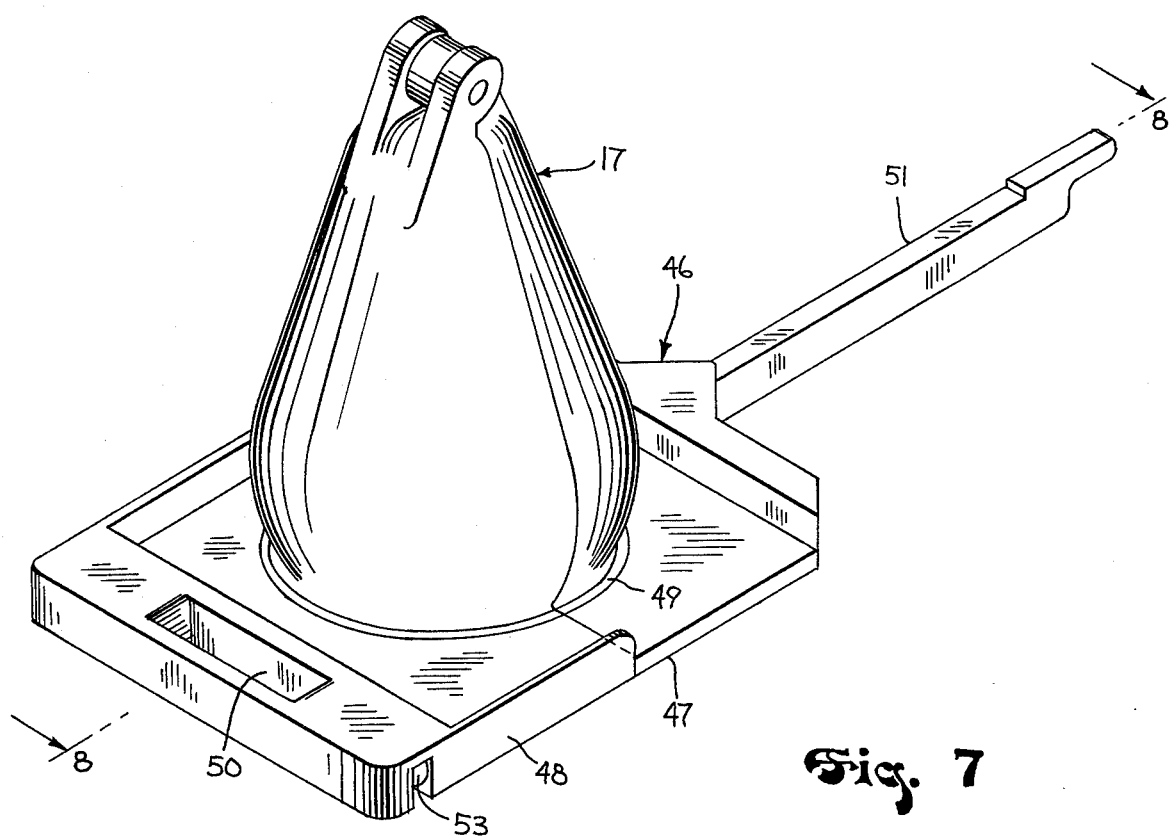
FIG. 7 is a perspective view of the preferred mold assembly.
Figure 9:
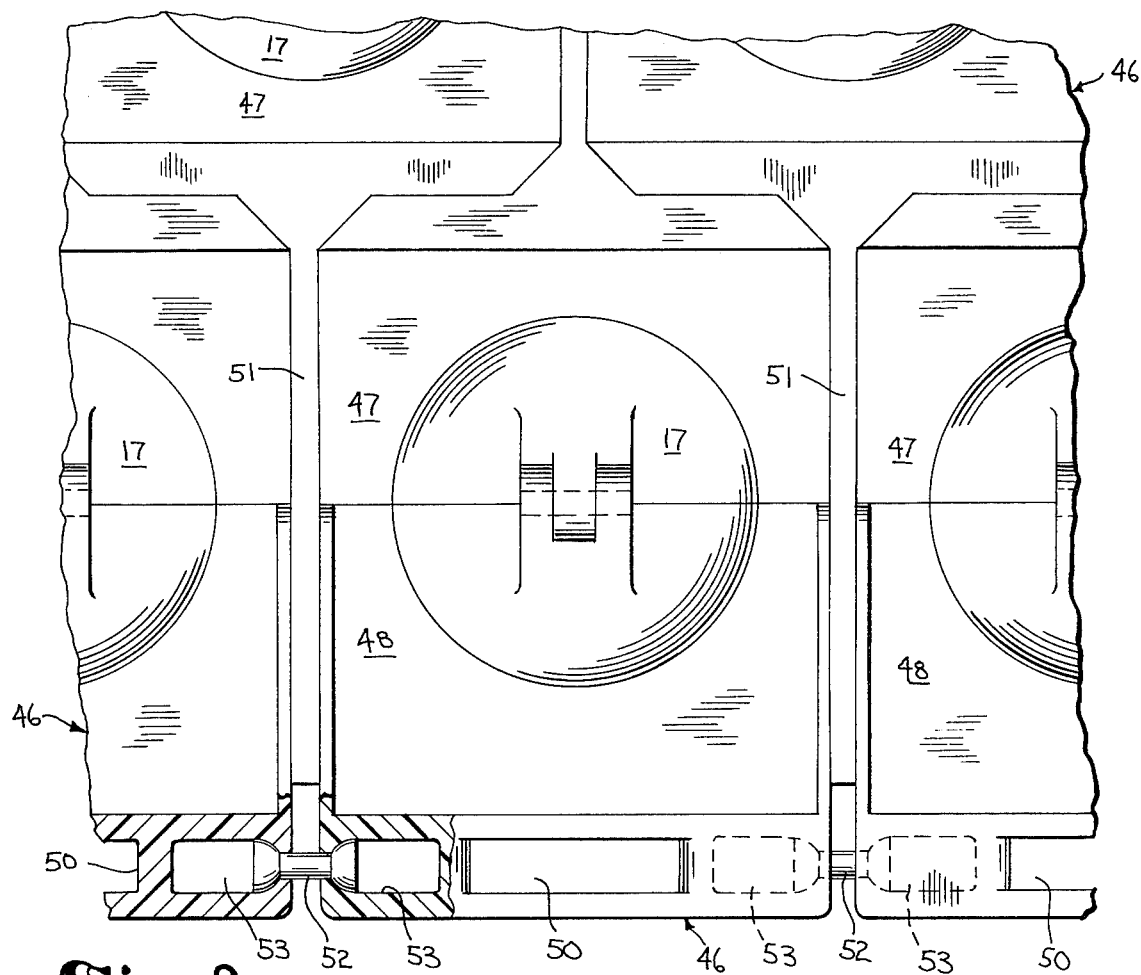
FIG. 9 is an enlarged partial view of the preferred endless belt.
Figure 8:
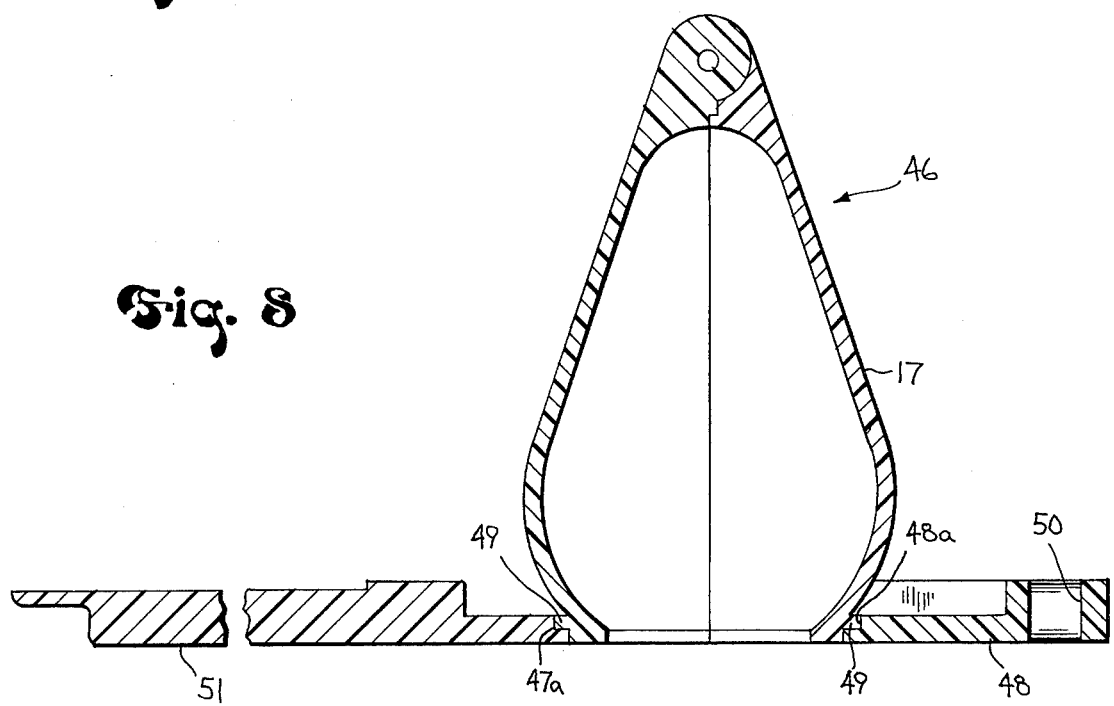
FIG. 8 is a view in section taken along the plane of the line 8—8 of FIG. 7.

The preferred endless belt 16 is made up of a plurality of mold assemblies 46 which are best seen in FIGS. 7, 8 and 9.

As seen in FIG. 7, the mold assembly 46 includes two flat base pieces 47 and 48 and the split mold 17 which is hinged at the top. As seen in FIG. 8, the bottom of the mold 17 is provided with an outwardly extending circumferential flange 49 and the base pieces 47 and 48 each have a semi-circular flange receiving recess 47a, 48a into which one half of the flange 49 can be friction fit. When the flange 49 is properly positioned in the recesses 47a, 48a, the two base pieces are held together by the split, hinged mold 17 to form the unitary mold assembly 46. Turning to FIG. 7, it can be seen that the base piece 47 is provided with a sprocket tooth receiving aperture 50 and the base piece 48 is provided with an outwardly projecting filler strip 51. The filler strip 51 performs two functions. It fills the spaces that would otherwise exist between the mold assemblies when the belts 16 are meshed as seen in FIG. 4, and it cooperates with the guide rails 22 to tilt, open and maintain the mold 17 open as seen in FIG. 6.

Turning now to FIG. 9, it can be seen that the mold assembly 46 is joined to each of the adjacent assemblies 46 on each side of it by a single dumbbell shaped pin 52. The pin 52 is snap fit into pin receiving recesses 53 in adjacent mold assemblies 46. Once in place, the neck and the enlarged ends of the pins 52 are designed to move freely within the recesses 53. The pin 52 forms the only connection between two adjacent mold assemblies 46 thereby permitting the mold assemblies 46 to pivot relative to each other without undue force being exerted on the other mold assemblies, or the remainder of the belt 16. The endless belts 16 are made up of a desired number of the mold assemblies 46 joined together in identical manner by the pins 52.

The two endless belts travel separate and substantially identical paths about their own separate sprocket wheels, guided by their own set of guide rails 22. The belts 16 come together and mesh only as they approach and pass through the filling station 18. Upon leaving the filling station they separate to enter separate saddle tanks 20. The tension of the belts can be varied for optimum performance by use of chain adjustment mechanisms 54 (see in FIG. 1).

It will be apparent to those skilled in the art that the flow rate of the uncured cheese from the extruder or molding machine 25 and the speed of the belts 16 must be coordinated so that the molds 17 will be completely filled without an excessive waste of energy or cheese. Both the speed of the belts and the flow of cheese from the extruder machine are preferably controlled by rheostats which are mounted in control box 55 (see in FIG. 1).

All the components of the described apparatus are preferably made of readily sanitizable materials. For example, the mold assemblies 46 are preferably of plastic and the tanks, frame and extruder are made of stainless steel.

Although the embodiment of the invention which has been described includes an endless belt made up of mold assemblies in which all the molds are of a uniform shape, it is to be understood that the present invention is not so limited. If desired, molds of different shapes can be mixed on the same belt provided they are of the same volume. Since the mold is friction fit into the base plates it is relatively easy to replace a mold with a new one of the same or a different shape. Furthermore, it is possible with the described apparatus to mold cheese pieces of two different volumes and/or shapes simultaneously, provided that all the molds on a given endless belt are of the same volume and the outlets of the extruder are properly shaped and sized.

The process of the invention can also be practiced with an apparatus having a single endless belt or the described apparatus can be modified to employ a single belt. In the latter case, the unused outlet of the extruding machine will be blocked and the pressure plate adjusted to compensate for the use of a single belt. When an apparatus using a single belt is employed, it may be desirable to maintain the temperature at the filling neck of the extruder at a higher temperature so that the cheese will stay soft and not cure or harden during the interruptions in flow resulting from non-continuous filling.

In addition to the previously mentioned advantages, the novel process can also make it possible to substantially reduce the time required for the cheese pieces to harden prior to packaging. This is accomplished by maintaining the temperature of brine which is used for spraying, cooling and curing at about 28° F. If desired, the cold brine can be supplied from a refrigerated in-plant source or a refrigerating unit can be made integral with the apparatus.

Finally, although the use of the preferred apparatus has been described in connection with the making of cheese, it is to be understood that the apparatus may be useful in molding shaped pieces of other materials which might not normally be considered to be cheese. Therefore, the use of the term "cheese" is intended to include such materials.

In view of the many changes and modifications which can be made without departing from the spirit or scope of the present invention, it is to be understood that the present invention is not to be limited by the specific embodiments described, but only by the scope of the claims which follow.

I claim:

1. An apparatus for molding a cheese piece of a desired shape comprises at least one openable hollow mold of the desired interior shape, means for filling said mold with soft cheese, means for cooling the cheese in the mold to partially harden the cheese, a tank adapted to hold a liquid bath and means for transporting said mold to a location in the tank where the mold is opened to release the partially hardened cheese piece below the surface of the liquid bath so that the fluid pressure of the liquid will prevent the shape of the cheese piece from being distorted.

2. An apparatus of claim 1 in which the mold is split and hinged so that it may be readily opened and closed.

3. An apparatus of claim 1 in which the means for transporting the mold is an endless belt to which the mold is attached and there is drive means for said belt.

4. An apparatus of claim 3 in which the endless belt is made up of a plurality of mold assemblies each including a split, hinged mold.

5. An apparatus of claim 3 in which adjacent mold assemblies are joined together by a single pin so that an individual mold assembly can be inverted without exerting a destructive force on the remainder of the belt.

6. An apparatus for molding cheese pieces of a desired shape includes:
   (a) a plurality of mold assemblies each including a hollow openable mold, said mold assemblies being joined together to form an endless belt,
   (b) a filling station for filling the molds with soft cheese,
   (c) a cooling station with means for spraying the cheese filled molds with a cooling liquid,
   (d) a tank for a liquid bath,
   (e) means for driving the endless belt to transport the mold assemblies from the filling station, to the cooling station and into the tank, and
   (f) guide means which retain the openable molds in a closed position at the filling station and at the cooling station and permit the molds to open in the tank to release the partially hardened cheese.

7. An apparatus of claim 6 in which the filling station includes an extruder having two outlets for introducing cheese into the hollow molds and in which there are two endless belts of mold assemblies.

8. An apparatus of claim 7 in which the two belts mesh at the filling station.

9. The apparatus of claim 8 in which the filling station includes a filling table having a top and a pressure plate assembly which exerts force upon the top of the meshed belts to keep the bottom of said belts flat upon the filling station table top.

10. The apparatus of claim 6 in which the molds are split and hinged at the top.

11. An apparatus of claim 6 in which the plurality of mold assemblies are joined together with pins which permit the individual mold assemblies to be tipped and inverted without exerting a destructive force on the remainder of the belt.

12. An apparatus of claim 6 in which the guide means are a plurality of guide rails positioned along the path of the endless belt.

13. An apparatus of claim 6 in which the guide means also close the molds once the cheese piece has been released and which includes a washing station for removing residual cheese from the empty molds.

* * * * *